INVENTOR.
LORENZ V. KUNKEL
BY
ATTORNEY

United States Patent Office 3,518,048
Patented June 30, 1970

3,518,048
METHOD OF INHIBITING CORROSION IN SOUR GAS SWEETENING SYSTEMS
Lorenz V. Kunkel, Tulsa, Okla., assignor to Pan American Petroleum Corporation, Tulsa, Okla., a corporation of Delaware
Filed July 17, 1967, Ser. No. 653,865
Int. Cl. B01d 47/00
U.S. Cl. 23—2                                    6 Claims

ABSTRACT OF THE DISCLOSURE

In a gas purification process wherein hydrogen sulfide is adsorbed by an alkanolamine solution in an absorption zone and desorbed in a regeneration zone, the improvement comprising coating the interior surfaces of the overhead system from zone with a solution of an alkanolamine to inhibit corrosion therein.

The present invention relates to a method for preventing or inhibiting corrosion in sour gas sweetening systems. More particularly it is concerned with the inhibition of corrosion occurring in the overhead system in an alkylolamine regeneration unit by providing in small quantities a lean stream of a suitable alkylolamine in the overhead system.

BACKGROUND

Absorption of acid constituents, such as hydrogen sulfide and carbon dioxide, from sour natural gas by the use of alkylolamines is a technique that has been known for many years. With the discovery of very sour natural gas stream such as those found in Canada, France and the United States, the demands placed on sweetening systems of this kind have increased greatly. Along with such demands for efficient gas sweetening methods have come a number of serious corrosion problems occurring generally on the rich solution inlet side of the rich-lean exchangers, absorber rich solution level control valves, and regenerator reboilers. For the most part the occurrence of corrosion in these areas has been eliminated.

A factor, however, that makes these corrosion problems most perplexing is that they can vary in number and in intensity with the composition of the gas being treated. For example, Canadian Pat. No. 651,379, which relates to the use of aqueous diethanolamine solutions for sweetening sour natural gas, discloses that such solutions are capable of handling high concentrations of acid gas in proportion in the amount of diethanolamine required. Specifically it is thought in the patent referred to that the molar ratio of acid gas to diethanolamine in the rich solution may range from about 0.9 to 1.3 mols for each mol of diethanolamine if pressures of the order of at least 20 atmospheres are used in the absorption step. These acid gas-amine molar ratios are said to be substantialy higher than can be tolerated by other amine compounds such as, for example, monoethanolamine.

DESCRIPTION OF THE INVENTION

Although not reported elesewhere to my knowledge, I have found that when using aqueous diethanolamine solutions for sweetening sour gas, corrosion occurs at a relatively rapid rate, for example, at about 75 mils (.075 inch) per year, in the amine regenerator overhead system. Specifically, the liquid from the regenerator reflux accumulator, when tested with a corrosion coupon, showed a corrosion rate of 74 mils per year. The pH of such liquid, which contains dissolved $H_2S$, $CO_2$ and about 0.3% diethanolamine, was about 6.4. Accordingly, I have overcome this problem by injecting a lean solution of a suitable alkylolamine in the regenerator overhead system and have found that by so doing the corrosion rate—where diethanolamine was used as the sweetening agent—was reduced to not more than about 0.1 mil per year.

Figure 1:
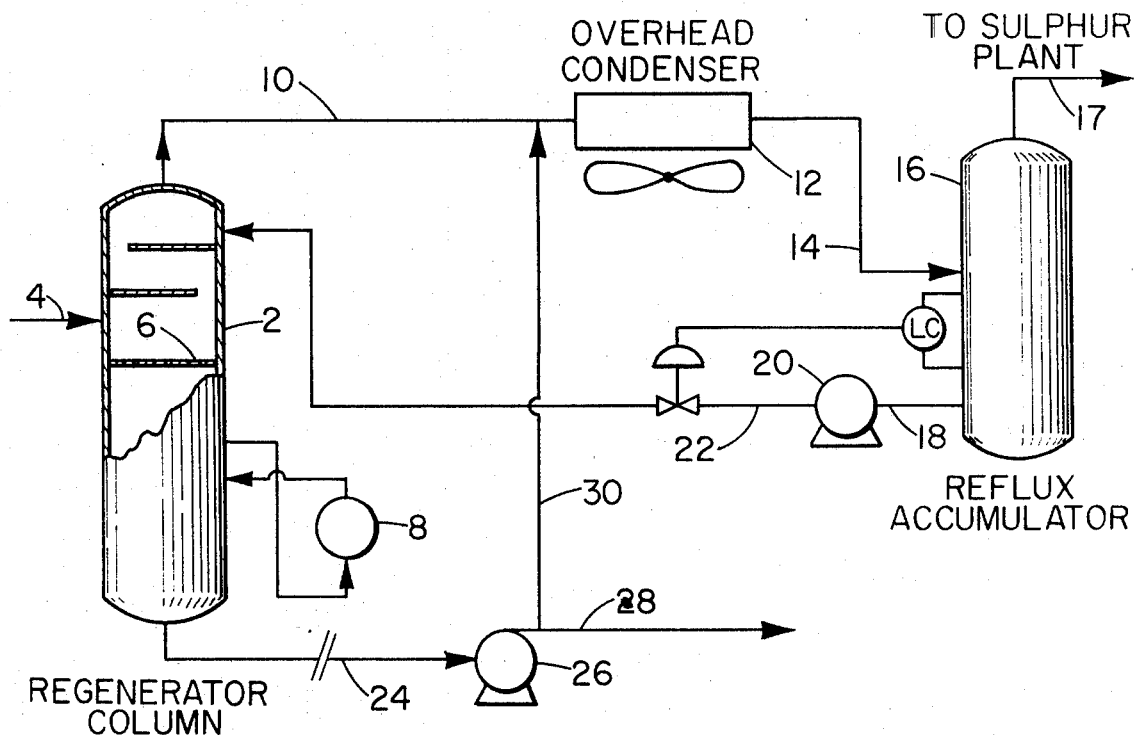

The method of my invention will be illustrated further by reference to the accompanying drawings wherein in FIG. 1 an aqueous diethanolamine solution rich in hydrogen sulfide is introduced into regenerator column 2 through valved line 4 just above the feed plate 6. This feed stream contains both liquid and gas and is supplied to column 2 at a rate of about 108,000 gallons of liquid per hour and 30,450 pounds of vapor per hour. Column 2 is operated at a pressure of between 14 and 20 p.s.i.g. and heated to a bottom tower temperature of about 240° F. by means of reboiler 8. Overhead a stream consisting essentially of acid gases and water vapor is taken off through line 10 at a temperature of about 230° F. at a rate of about 77,042 pounds per hour. This stream flows into an air cooled condenser 12 where the effluent therefrom is reduced in temperature to about 110° F. This cool stream is then conducted through line 14 to reflux accumulator 16 where uncondensed acid gas flows out the top through line 17 to further processing at about 55,540 pounds per hour. Out of the bottom of accumulator 16, which is operated at a pressure of from about 8 to 14 p.s.i.g., a liquid stream is withdrawn through line 18 at a rate of 21,502 pounds per hour and is transferred as reflux by pump 20 through valved line 22 into the top of regeneration tower 2. From the base of tower 2 a lean (25 weight percent) diethanolamine stream is withdrawn through line 24 at a rate of 104,000 gallons per hour at 260° F. by means of pump 26 and returned to the amine contacting tower (not shown) via line 28. Off of line 28 a small stream of lean diethanolamine solution is transferred through line 30 to line 10 at a rate of about 120 gallons per hour.

Without injection of the diethanolamine solution into line 10, as described, the regenerator reflux liquid contained 0.3% diethanolamine and had a pH of 6.4. By injecting a 25% diethanolamine solution into the regenerator overhead system in accordance with my invention under the operating conditions mentioned above the diethanolamine concentration of the reflux stream in line 22 was increased to 1.5% with a resultant increase in pH to 7.1. Corrosion rates as monitored by steel test coupons dropped to 0.09 ml per year for a 35-day exposure period and to 0.03 mil per year for an 87 day test period.

While I have found as indicated above the addition of a diethanolamine solution to the regenerator overhead system to be very effective in inhibiting corrosion therein, the manner in which such solutions are added thereto is important. Thus, in the actual use of this invention it was found that the nozzle design at the point of injection of the lean amine solution has a considerable bearing on the degree of protection obtained in the overhead system. A hollow cone spray nozzle was originally inserted in the center of line 10. Tests subsequently indicated very little change in the diethanolamine concentration of the reflux liquid whereas the diethanolamine concentration in the acid gas scrubber liquid increased from 0.03 to 1.0%. This indicated that little of the injected diethanolamine was getting to the walls of the overhead line before it entered reflux accumulator 16. Apparently the diethanolamine was being entrained with the acid gas and dropped out in an acid gas scrubber (not shown) located downstream of reflux accumulator 16.

Figure 2:
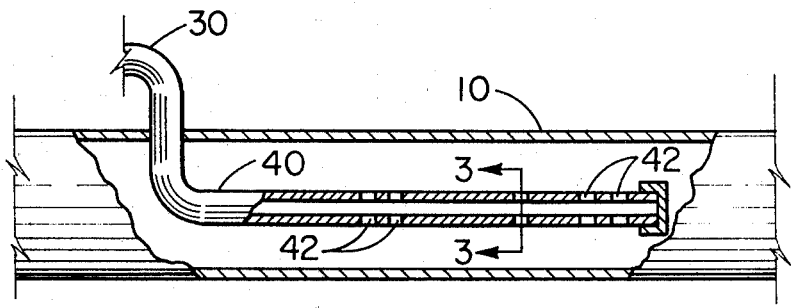
Figure 3:
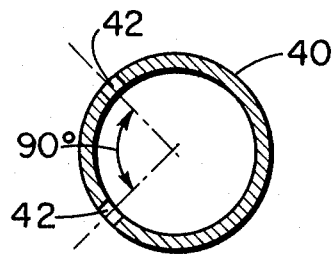

The hollow spray cone nozzle was replaced with a perforated length of pipe 40 (shown in greater detail in FIGS. 2 and 3), the latter being a view of FIG. 2 taken along line 3—3. In this particular design perforations 42 were arranged in two rows located with respect to one another as shown in FIG. 3.

With this type of injection satisfactory protection of the overhead system can be obtained with about three-fourths of the diethanolamine thus introduced dropping out in the reflux accumulator liquid. Prior to injection of the diethanolamine solution in this manner the low strength liquid which dropped out in the acid scrubber was dumped to the sewer and only minimum loss of diethanolamine was experienced. However, when the diethanolamine injection facilities were placed in operation, return lines were installed from the acid gas scrubber to the reflux accumulator so that the acid gas scrubber liquid could be pumped back to the regenerator reflux system. Otherwise excessive loss of diethanolamine would have occurred.

One of the special advantages of using the process of my invention in inhibiting corrosion of the type contemplated herein is that such corrosion can be satisfactorily suppressed without the introduction of any extraneous material into the system to be protected.

In construing the scope of my invention it should be understood that the process herein described and claimed may be employed in any gas sweetening systems where hydrogen sulfide corrosion occurs. Typical of the procedures contemplated is the method described and claimed in Canadian Pat. 651,379.

I claim:

1. In a process for the removal of hydrogen sulfide from a gaseous mixture thereof by contacting said mixture with an aqueous solution of an alkylolamine to absorb the hydrogen sulfide from said mixture, thereafter subjecting the resulting alkylolamine solution containing said hydrogen sulfide to distillation in a distillation zone to bring said hydrogen sulfide overhead in vapor form from said zone and removing a lean alkylolamine solution substantially free of said hydrogen sulfide from the lower portion of said zone, the improvement comprising inhibiting corrosion in the overhead system from said zone by coating the interior surfaces of said system with a liquid solution of an alkylolamine.

2. The process of claim 1 wherein the gaseous mixture contains hydrogen sulfide and carbon dioxide.

3. The process of claim 1 wherein the alkylolamine used to remove the hydrogen sulfide from said mixture and the alkylolamine injected into said overhead system are the same.

4. The process of claim 2 in which the alkylolamine employed is diethanolamine.

5. The process of claim 3 wherein said gaseous mixture is a natural gas.

6. The process of claim 4 wherein the diethanalamine injected into said overhead system is present in an amount corresponding to from about .5 to about 2.5 weight percent based on the weight of the hydrogen sulfide in the overhead system from said zone.

References Cited
UNITED STATES PATENTS 3,144,301   8/1964   Mayland _____ 23—2

EARL C. THOMAS, Primary Examiner